Oct. 16, 1956  H. H. WENZEL  2,766,771

CONTROL VALVE

Filed March 3, 1952

1st POSITION

2nd POSITION

3rd POSITION

INVENTOR.
HANS H. WENZEL
BY
George H Fisher
ATTORNEY

United States Patent Office 2,766,771
Patented Oct. 16, 1956

2,766,771

CONTROL VALVE

Hans H. Wenzel, Chicago, Ill., assignor to Minneapolis-Honeywell Regulator Company, Minneapolis, Minn., a corporation of Delaware Application March 3, 1952, Serial No. 274,636

2 Claims. (Cl. 137—595)

This invention relates to an improved pneumatic switch. Pneumatic switches now in use generally take the form of plug valves and, because leak tightness is very important, the valve parts are generally lapped to a precise fit. This is not only a time-consuming and costly operation but also the extremely close fit frequently results in seizing or binding of the plug when it has not been operated for an appreciable time.

The present invention eliminates the difficulties of the prior art valves or switches by using flexible seals such as O-rings for both sealing and valving functions and thereby eliminates metal to metal contact. Because of the deformable nature of the O-rings, no precise tolerances are necessary and, by a judicious choice of materials, long life and easy operation of the device is assured.

It is thus an object of this invention to provide an improved pneumatic switch, improvements being in both ease of manufacture and performance.

It is a further object to provide a fluid switch or valve wherein the valving function as well as sealing is accomplished by standard, easily obtainable seals such as O-rings.

It is still another object to provide a valve or switch construction wherein a plurality of the devices may be easily connected in tandem for simultaneous operation.

These and other objects will become apparent upon a study of the following specifications and drawings wherein.

Figure 1:
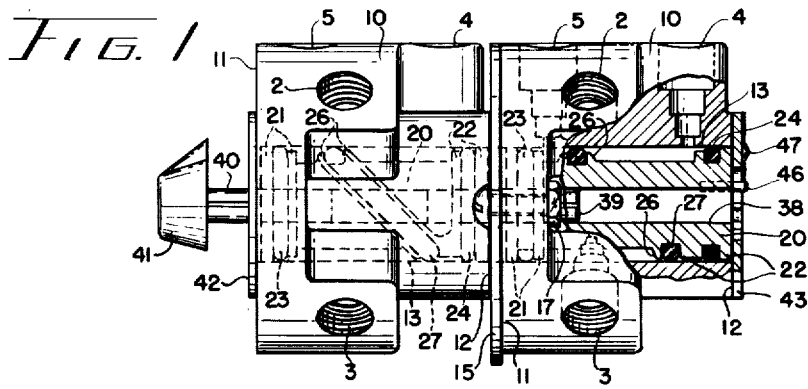
Figure 1 is a side elevation view of a plural valve arrangement with parts broken away and parts in section.
Figure 4:
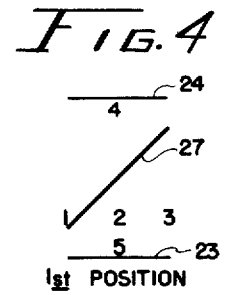
Figures 4, 5 and 6 show schematically the basic switching circuits for each of the valves of Figure 1.
Figure 5:
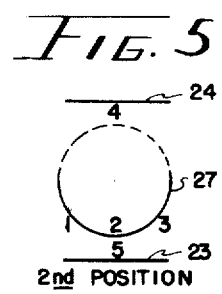
Figure 6:
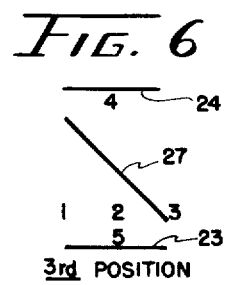

In Figure 1, two of the present valves are shown in tandem, and are operable simultaneously by the adjusting knob. As these valves are identical, a description of one fits the other equally well, hence duplicate numbering is used. Each of the valves of Figure 1 includes a body 10 of an irregular cylindrical shape, body 10 having a front end 11 and a back end 12. Also, a cylindrical bore 13 extends through body 10 from the front to the back end, the surfaces of ends 11 and 12 being parallel and the bore 13 being perpendicular to these surfaces. A plurality of ports 1, 2, 3, 4 and 5 extend radially into bore 13, each port comprising an opening into the bore 13 and a connecting threaded socket for a pipe or tube connection. Ports 4 and 5 are aligned with the axis of bore 13, with port 4 being near the back end of body 10 and port 5 near the front end 11 of the body although, as is apparent, this alignment is only for convenience. Ports 1, 2 and 3 are arranged in a plane transverse to the axis of the bore and between ports 4 and 5, the plane of these ports being nearer to 5 than to 4 although a reverse arrangement may also be used. Ports 1, 2 and 3 are arranged 90° apart and, with this spacing, an additional port may be used if desired and, if still more ports are needed, a lesser angular spacing may be used. For convenience in showing only, Figures 4, 5 and 6 show ports 2 and 4 in alignment although they are not aligned in the other figures. The two bodies 10 in Figure 1 are held in tandem relation by a circular connecting plate 15 preferably having a central opening at least as large as bore 13 and in alignment therewith. Plate 15 is attached to the back end 12 of the left body by screws 16 and to the front end 11 of the right body by bolts 17 but, as will be apparent, this is only one of several arrangements that might be used for connecting these bodies in tandem. Obviously, any desired number of bodies and plugs, described below, may be connected together in a similar manner and where reference is made to a pair, it is intended that the same considerations hold for more than two units.

Valving or switching is accomplished by a rotatable plug 20 in each bore 13, end plug 20 being generally of appreciably less diameter than bore 13 and having spaced pairs of circumferential ribs 21 and 22 for guiding and holding end sealing O-rings 23 and 24, respectively. O-ring 23 is arranged outside of port 5 and O-ring 24 is disposed beyond port 4. Another set of guide ribs 26 is arranged around plug 20 in a plane diagonal to the axis of the plug and they guide and hold a diagonal O-ring 27. As shown in the drawings, the left portion of the O-ring 27 lies between parallel planes extending through ports 1, 2 and 3 and port 5 and the right portion of ring 27 lies to the left of a similar parallel plane through port 4. O-rings 23, 24 and 27 are so proportioned that they are sufficiently compressed between plug 20 and bore 13 to prevent air leakage past them and yet not unduly retard rotation of the plug. Excellent results from both the sealing and friction standpoints have been obtained with a composition including Buna rubber, known commercially as Parker's compound, but of course, any suitable material may be used for these rings and may or may not include a lubricant such as graphite. Material used for the body 10 and the plug 20 is not critical but aluminum has been found quite satisfactory. Plug 20 is perhaps most conveniently formed by casting and then machining if and where necessary. While O-rings are the preferred form of sealing means, any other suitable flexible sealing means may be used.

Figure 2:
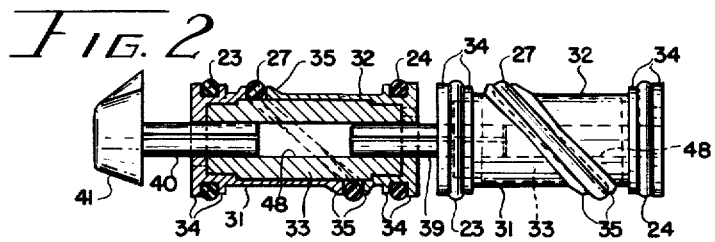
Figure 2 is a side elevation view of modified valve plug members with parts in section.

Instead of using unitary plugs, such as 20, they may be built up from similar halves, such as 31 and 32, assembled on an arbor or core member 33, as in Figure 2. Thus, each half has circumferential ribs 34 for guiding and holding the end sealing O-rings and each half also has a diagonal extending rib 35 and ribs 35, in combination with core member 33, form the groove for holding the diagonal O-ring. By making similar halves, as shown, die-casting of the parts becomes practical and tooling costs are kept desirably low.

Plugs 20 are found with an inner bore 38 and are secured together by a dowel pin 39 or the like, preferably an elastic one, and a similar pin 40 is used to connect the left plug 20 with manual adjusting knob 41. A retaining plate 42 attached to the front end 11 of the left body 10 and having a bore smaller than plug 20 but, of course, larger than pin 40, prevents leftward movement of plugs 20 and a plate 43 at the right or back end 12 of the right body 10 prevents a rightward movement of the plugs 20. If desired, a suitable spacer may be located between plugs 20 on pin 39 to thereby facilitate assembly. In addition, plate 43 has a pair of limit stop ears 44 and 45 cooperating with stop pin 46 in the end of plug 20 for limiting the rotative movement of the plugs, for this example, to 180°. Further, a spring detent 47 attached to plate 43 serves to properly locate the plugs for an intermediate adjustment. Obviously, this detent and stop arrangement is only suggestive.

The plugs shown in Figure 2 are held together for rotative purposes exactly as in Figure 1, with core member 33 each having a bore 48 for receiving the connecting pins and, of course, the detent and stop means described above are equally useful with the plugs of Figure 2. In the arrangement shown in Figure 1, with the valve bodies 10 parallel, the valve plugs 20 are also arranged parallel but, if desired, one of the valve bodies may be rotated through a desired angle, such as 180° with respect to the other and/or its plug may be rotated a corresponding amount. If such a rotation of one valve member relative to the other be made, the detent means may require modification.

Figure 3:
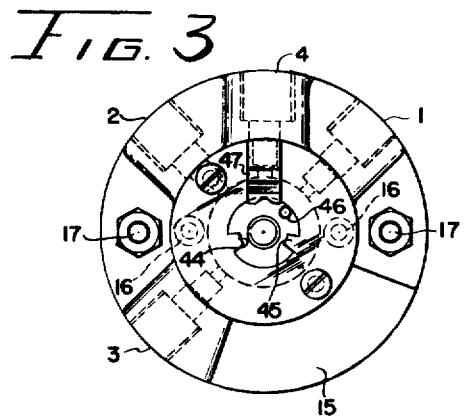
Figure 3 is an end view of a valve such as in Figure 1.

To better show the normal or basic switching circuits of each of the above valves, reference is made to Figures 4, 5 and 6 wherein, with the diagonal O-ring arranged as in Figure 4, the maximum counter-clockwise rotation of knob 41 as seen from the knob end of the structure of Figure 1 or maximum clockwise rotation of the plugs as seen in Figure 3, port 1 is connected to port 4 and ports 2, 3 and 5 are all in communication. By adjusting knob 41 to the intermediate position, so that pin 46 is held by detent 47, then the second position is attained, as shown in Figure 5, and port 2 is connected to port 4 and ports 1, 3 and 5 are in communication with each other. A maximum clockwise rotation of knob 41, or the maximum counter-clockwise rotation as seen in Figure 3, puts ports 3 and 4 in communication, as shown in Figure 6, and ports 1, 2 and 5 are in communication with each other. Obviously, if any of these ports are not needed for the switching operations desired, they may be plugged and thus made inoperative. Also, by using two or more valves in tandem and by varying the angular relation between them, many circuit combinations may be built up. Also, while it is preferable from a business viewpoint to make the valve bodies and plugs separate, as shown, they may be combined in a unitary fashion if desired.

As many substitutions and equivalents will be readily apparent upon studying the above disclosure, the scope of this invention should be determined only by the appended claims.

I claim as my invention:

1. A valve comprising a body portion, a cylindrical bore of uniform diameter throughout extending through said body portion, a plurality of spaced ports in said body opening into said bore, a rotatable plug member in said bore substantially coextensive in length with said bore and having an appreciable reduced diametrical dimension from that of said bore, said plug comprising a pair of similar hollow plug halves assembled axially on an inner hollow arbor member, each of said plug halves having a pair of spaced radially extending circumferential ribs near one extremity and a diagonally extending circumferential rib near the other extremity, said diagonally extending ribs of said plug halves being parallel when the halves are assembled, sealing means positioned between the circumferential ribs at each end of said plug and extending beyond said ribs, flexible sealing means held in place between said diagonally extending ribs by its own tension and projecting radially beyond said ribs, said sealing means on said plug member contacting said body portion when said plug member is positioned in said bore and supporting and guiding said plug member in said bore, cover means secured to said body portion covering each extremity of said bore to prevent substantially axially movement of said plug member and at least one of said cover means having an aperture therein adapted to align with the opening in said arbor member, and dowel means inserted into said hollow arbor member and through said aperture in said cover means to rotate said plug member.

2. A plural valve assembly comprising at least two valves as defined in claim 1, with adjacent cover means removed, and including a connecting plate between the bodies of said valves for securing the valves in assembled tandem relationship, and dowel means extending between and positioned within the arbor members of the plug means inserted into said hollow arbor member and the plugs.

References Cited in the file of this patent

UNITED STATES PATENTS

| | | |
|---|---|---|
| 1,270,722 | Gillette | June 25, 1918 |
| 1,474,756 | Beach | Nov. 20, 1923 |
| 1,787,628 | Jones | Jan. 6, 1931 |
| 2,145,383 | Alden | Jan. 31, 1939 |
| 2,177,301 | Kyes | Oct. 24, 1939 |
| 2,417,242 | Eckel | Mar. 11, 1947 |
| 2,524,142 | Seeloff | Oct. 3, 1950 |
| 2,547,116 | Gould | Apr. 3, 1951 |
| 2,631,002 | Mueller | Mar. 10, 1953 |

FOREIGN PATENTS

| | | |
|---|---|---|
| 625,998 | Great Britain | July 7, 1949 |
| 687,934 | France | Aug. 14, 1930 |

U. S. DEPARTMENT OF COMMERCE
PATENT OFFICE

CERTIFICATE OF CORRECTION

Patent No. 2,766,771      Hans H. Wenzel      October 16, 1956

It is hereby certified that error appears in the printed specification of the above numbered patent requiring correction and that the said Letters Patent should read as corrected below.

Column 4, lines 30 and 31, strike out "means inserted into said hollow arbor member and the plugs" and insert instead -- members of adjacent valves for simultaneously rotating the plugs --.

Signed and sealed this 27th day of May 1958.

(SEAL)
Attest:
KARL H. AXLINE
Attesting Officer

ROBERT C. WATSON
Commissioner of Patents